(12) United States Patent
Shiu et al.

(10) Patent No.: US 10,637,523 B2
(45) Date of Patent: *Apr. 28, 2020

(54) METHODS FOR AVOIDING INTER-MODULATION DISTORTION AND COMMUNICATIONS APPARATUSES UTILIZING THE SAME

(71) Applicant: MEDIATEK INC., Hsinchu (TW)

(72) Inventors: Tzyuan Shiu, Taipei (TW); Sheng-Che Tseng, New Taipei (TW); Shih-Chieh Yen, Taipei (TW); Chi-Yao Yu, Zhubei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,056

(22) Filed: May 11, 2018

(65) Prior Publication Data
US 2018/0269912 A1 Sep. 20, 2018

Related U.S. Application Data

(63) Continuation of application No. 15/465,737, filed on Mar. 22, 2017, now Pat. No. 9,998,160.
(Continued)

(51) Int. Cl.
*H04B 1/12* (2006.01)
*H04L 27/152* (2006.01)
(Continued)

(52) U.S. Cl.
CPC ............ *H04B 1/123* (2013.01); *H04B 15/06* (2013.01); *H04L 25/03* (2013.01); *H04L 27/152* (2013.01)

(58) Field of Classification Search
CPC ..... H04L 5/001; H04L 27/265; H04L 5/0094; H04L 1/00; H04L 25/08; H04L 27/0008;
(Continued)

(56) References Cited

U.S. PATENT DOCUMENTS

2008/0176523 A1* 7/2008 Sutton ................. H04B 1/0475
455/76
2011/0217918 A1 9/2011 Rechberger et al.
(Continued)

FOREIGN PATENT DOCUMENTS

CN 105703794 A 6/2016

OTHER PUBLICATIONS

Combined Chinese Office Action and Search Report dated Apr. 1, 2019 in Chinese Patent Application No. 201710504854.7 (with English translation of Category of Cited Documents), citing document AO therein, 9 pages.

*Primary Examiner* — Golam Sorowar
(74) *Attorney, Agent, or Firm* — Oblon, McClelland, Maier & Neustadt, L.L.P.

(57) ABSTRACT

A method for avoiding inter-modulation distortion in a communications apparatus capable of supporting carrier aggregation and communicating with a peer communications apparatus in a wireless network via at least a first CC and a second CC includes: determining a frequency adjustment value for adjusting a first oscillating frequency of a first local oscillation signal utilized for processing an RF signal of the first CC or a second oscillating frequency of a second LO signal utilized for processing an RF signal of the second CC when an RF signal or a baseband signal of the second CC is interfered with by an inter-modulation distortion signal contributed by any signal component related to the first CC; and adjusting the first oscillating frequency or the second oscillating frequency according to the frequency adjustment value.

9 Claims, 9 Drawing Sheets

Related U.S. Application Data

(60) Provisional application No. 62/417,375, filed on Nov. 4, 2016.

(51) Int. Cl.
*H04L 25/03* (2006.01)
*H04B 15/06* (2006.01)

(58) Field of Classification Search
CPC ... H04L 27/2647; H04L 5/0007; H04L 5/005; H04L 5/0062; H04L 5/0066; H04B 1/0475; H04B 1/10; H04B 1/1027; H04B 1/005; H04B 1/0483; H04B 1/1036; H04B 1/16; H04B 1/30; H04B 1/525; H04B 15/00; H04B 15/005; H04B 15/04; H04B 15/06; H04W 88/06; H04W 52/146; H04W 52/34; H04W 72/082; H04W 48/18; H04W 52/16; H04W 52/30; H04W 52/367; H04W 72/0453
See application file for complete search history.

(56) References Cited

U.S. PATENT DOCUMENTS

| | | | |
|---|---|---|---|
| 2013/0044621 A1 | 2/2013 | Jung | |
| 2015/0334663 A1 | 11/2015 | Ueda | |
| 2015/0334710 A1 | 11/2015 | Tang et al. | |
| 2016/0173215 A1* | 6/2016 | Laaser | H04J 1/12 |
| | | | 370/201 |
| 2016/0329920 A1* | 11/2016 | Li | H04B 1/525 |
| 2017/0104507 A1* | 4/2017 | Fernando | H04B 1/16 |

* cited by examiner

METHODS FOR AVOIDING INTER-MODULATION DISTORTION AND COMMUNICATIONS APPARATUSES UTILIZING THE SAME

CROSS REFERENCE TO RELATED APPLICATIONS

This application is a Continuation of pending U.S. application Ser. No. 15/465,737, filed Mar. 22, 2017, which claims the benefit of U.S. Provisional Application No. 62/417,375 filed 2016 Nov. 4 and entitled "Method and Apparatus of Self-interference Handling for Supporting Carrier Aggregation", and the entire contents of which are hereby incorporated by reference.

BACKGROUND OF THE INVENTION

Field of the Invention

The invention relates to methods and apparatuses to avoid inter-modulation distortion.

Description of the Related Art

Due to advancements in mobile communication technology in recent years, various communication services, such as voice call services, data transfer services, and video call services, etc., may be provided to users regardless of their location. Most mobile communications systems are multiple access systems in which access and wireless network resources are allocated to multiple users. The multiple access technologies employed by the mobile communications systems include the 1× Code Division Multiple Access 2000 (1× CDMA 2000) technology, the 1× Evolution-Data Optimized (1×EVDO) technology, the Orthogonal Frequency Division Multiplexing (OFDM) technology, and the Long Term Evolution (LTE) technology. Evolved from the LTE, the LTE Advanced is a major enhancement of the LTE standard. The LTE Advanced should be compatible with LTE equipment, and should share frequency bands with the LTE communications system. One of the important benefits of LTE Advanced is its ability to take advantage of advanced topology networks, wherein optimized heterogeneous networks have a mix of macros with low power nodes such as picocells, temtocells and new relay nodes.

In addition, the LTE Advanced also introduces a multi-carrier feature so as to be able to use ultra wide bandwidth, up to 100 MHz of a spectrum and support very high data rates. The multicarrier feature introduced in the LTE Advanced is supported by Carrier Aggregation (CA). In CA, two or more Component Carriers (CCs) are aggregated in order to provide wider transmission bandwidths up to 100 MHz. The CA can be applied to aggregate both contiguous and non-contiguous CCs. It is also possible to configure User Equipment (UE) to aggregate a different number of CCs originating from the same evolved Node B (eNB) and of possibly different bandwidths in the uplink (UL) and the downlink (DL). The UE may simultaneously receive or transmit radio frequency (RF) signals via one or multiple CCs depending on its capabilities.

However, inter-modulation distortion (IMD) may occur to the UE due to hardware device's nonlinearity when CA technology is applied. The receiving performance of the UE may be seriously degraded when the interference power is great. Therefore, methods and apparatuses to avoid the IMD are highly required.

BRIEF SUMMARY OF THE INVENTION

Communications apparatuses and methods for avoiding inter-modulation distortion in a communications apparatus are provided. An exemplary embodiment of a communications apparatus capable of supporting carrier aggregation and communicating with a peer communications apparatus in a wireless network via at least a first component carrier (CC) and a second CC comprises a radio frequency (RF) signal processing device and a baseband signal processing device. The RF signal processing device processes an RF signal of the first CC and an RF signal of the second CC. The baseband signal processing device processes a baseband signal of the first CC and a baseband signal of the second CC. The RF signal processing device at least comprises a receiving (RX) frequency synthesizer providing a first local oscillation (LO) signal oscillated at a first oscillating frequency for processing the RF signal of the first CC and a second oscillating frequency for processing the RF signal of the second CC. The baseband signal processing device at least comprises a low intermedium frequency (IF) RX controller coupled to the RX frequency synthesizer, determining a frequency adjustment value for adjusting the first oscillating frequency or the second oscillating frequency and providing the frequency adjustment value to the RX frequency synthesizer. The RX frequency synthesizer further adjusts the first oscillating frequency or the second oscillating frequency according to the frequency adjustment value.

An exemplary embodiment of a method for avoiding inter-modulation distortion in a communications apparatus capable of supporting carrier aggregation and communicating with a peer communications apparatus in a wireless network via at least a first CC and a second CC includes: determining a frequency adjustment value for adjusting a first oscillating frequency of a first local oscillation signal utilized for processing an RF signal of the first CC or a second oscillating frequency of a second LO signal utilized for processing an RF signal of the second CC when an RF signal or a baseband signal of the second CC is interfered with by an inter-modulation distortion signal contributed by any signal component related to the first CC or the second CC; and adjusting the first oscillating frequency or the second oscillating frequency according to the frequency adjustment value.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
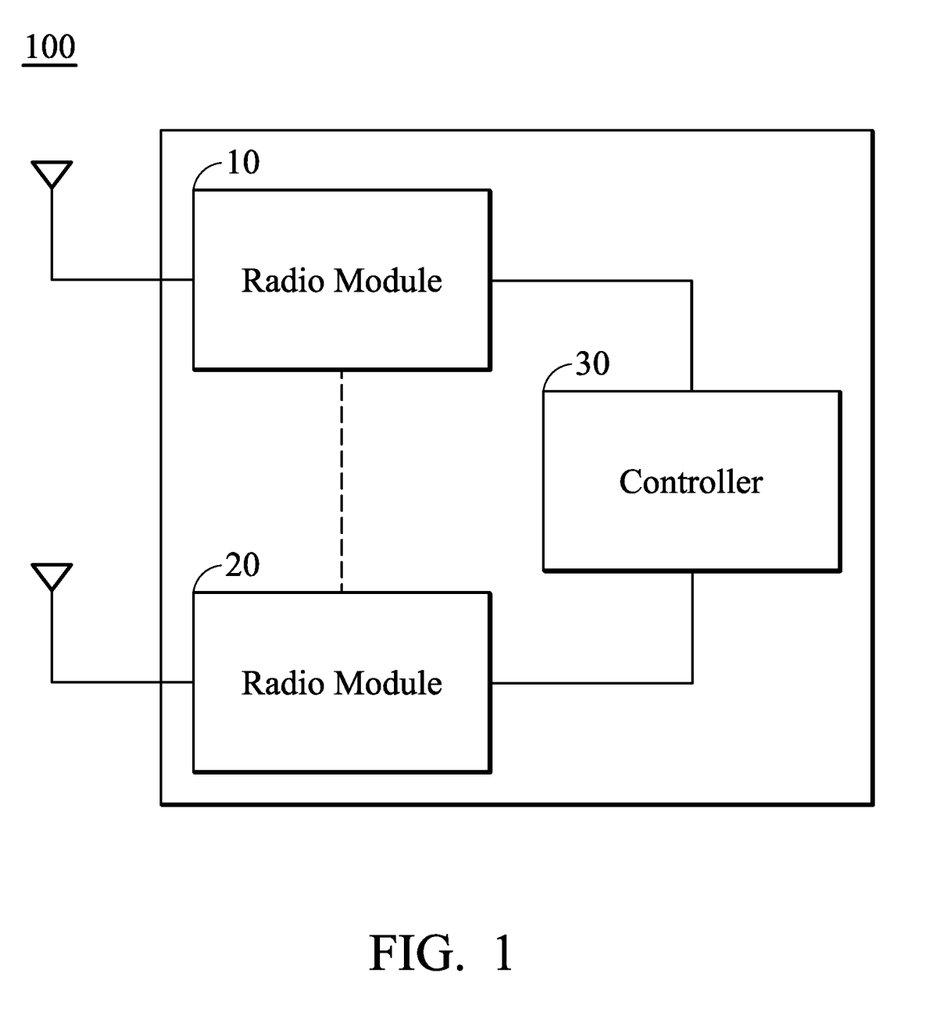
FIG. 1 shows a block diagram of a communications apparatus according to an embodiment of the invention.

FIG. 1 shows a block diagram of a communications apparatus according to an embodiment of the invention. The communications apparatus 100 may comprise one or more than one radio modules, such as radio modules 10 and 20 as shown. Each radio module is arranged to provide a predetermined wireless communications service and may communicate with a peer communications apparatus (for example, a base station, a node-B, an eNB, an access point, or any other communications device) in a corresponding wireless network in compliance with a predetermined protocol of a predetermined Radio Access Technology (RAT). Note that although there are two radio modules shown in FIG. 1, the invention should not be limited thereto. For example, in other embodiments of the invention, the communications apparatus 100 may also comprise only one, or more than two radio modules. Therefore, the invention should not be limited to any specific implementation method.

According to an embodiment of the invention, the communications apparatus 100 may further comprise a controller 30. The controller 30 is coupled to the one or more radio modules, such as the radio modules 10 and 20, and may control operations of the communications apparatus 100 and the radio modules. Note that although the controller 30 shown in FIG. 1 is configured outside of the radio modules, the invention should not be limited thereto. For example, in other embodiments of the invention, the controller may also be configured inside of a radio module, or may be integrated into any internal controller or processor of a radio module, or there may be no controller 30 comprised in the proposed communications apparatus. Therefore, the invention should not be limited to any specific implementation method.

Note further that FIG. 1 is a simplified block diagram of the proposed communications apparatus to give a clear illustration of the concept of the invention. In other embodiments of the invention, the communications apparatus 100 may further comprise other hardware modules and/or components not shown in FIG. 1, and the invention should not be limited to what is shown in FIG. 1.

In addition, note further that, in the embodiments of the invention, when the communications apparatus 100 comprises more than one radio module, the radio modules may be implemented in different chips and communicate with each other via a specific interface disposed therebetween, or may be integrated into one chip, such as an SoC (system on chip), and connect to each other by internal wires. Therefore, the invention should not be limited to any specific implementation method.

In the embodiments of the invention, the communications apparatus 100 may be a notebook computer, a cellular phone, a portable gaming device, a portable multimedia player, a tablet computer, a Global Positioning System (GPS) receiver, a Personal Digital Assistant (PDA), or others. In addition, in the embodiments of the invention, the radio module(s) comprised in the radio modules co-located in the communications apparatus 100 may include a Wi-Fi module, a Bluetooth module, a 2G/3G/4G or LTE module, a BLE module, a BLR module, or others, for providing the corresponding communications services in compliance with the corresponding protocols.

Figure 2:
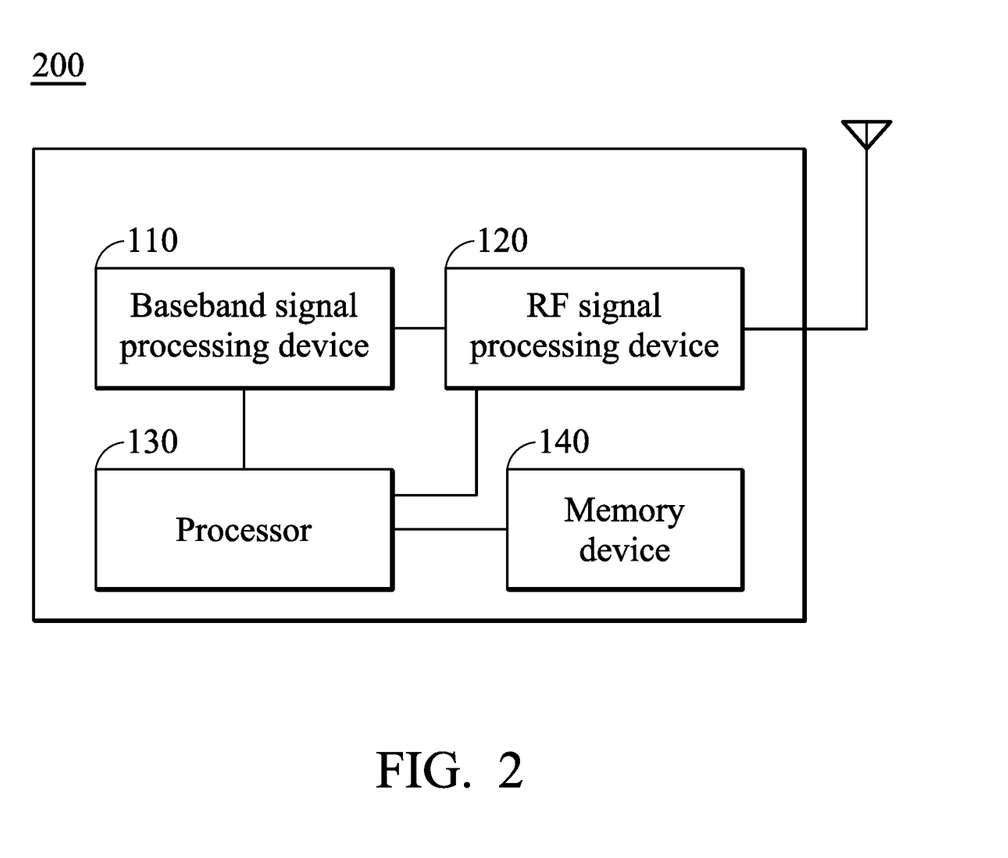
FIG. 2 shows a block diagram of a radio module according to an embodiment of the invention.

FIG. 2 shows a block diagram of a radio module according to an embodiment of the invention. The radio module 200 may comprise at least a baseband signal processing device 110, a radio frequency (RF) signal processing device 120, a processor 130, a memory device 140, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2. For example, in some embodiments of the invention, the radio module 200 may further be extended to comprise more than one antenna, and the invention should not be limited to what is shown in FIG. 2.

The RF signal processing device 120 may receive RF signals via the antenna module and process the received RF signals to convert the received RF signals to baseband signals (that is, zero intermedium frequency (IF)) or low IF signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, or others.

The baseband signal processing device 110 may process (for example, decode and demodulate) the baseband signals corresponding to the RF signals processed by the RF signal processing device 120 to obtain information or data transmitted by the peer communications apparatus, and may process (for example, encode and modulate) uplink data to be transmitted to the peer communications apparatus as the baseband signals and provide the baseband signals to the RF signal processing device 120. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110, the RF signal processing device 120 and the memory device 140. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the radio module 200.

Figure 3:
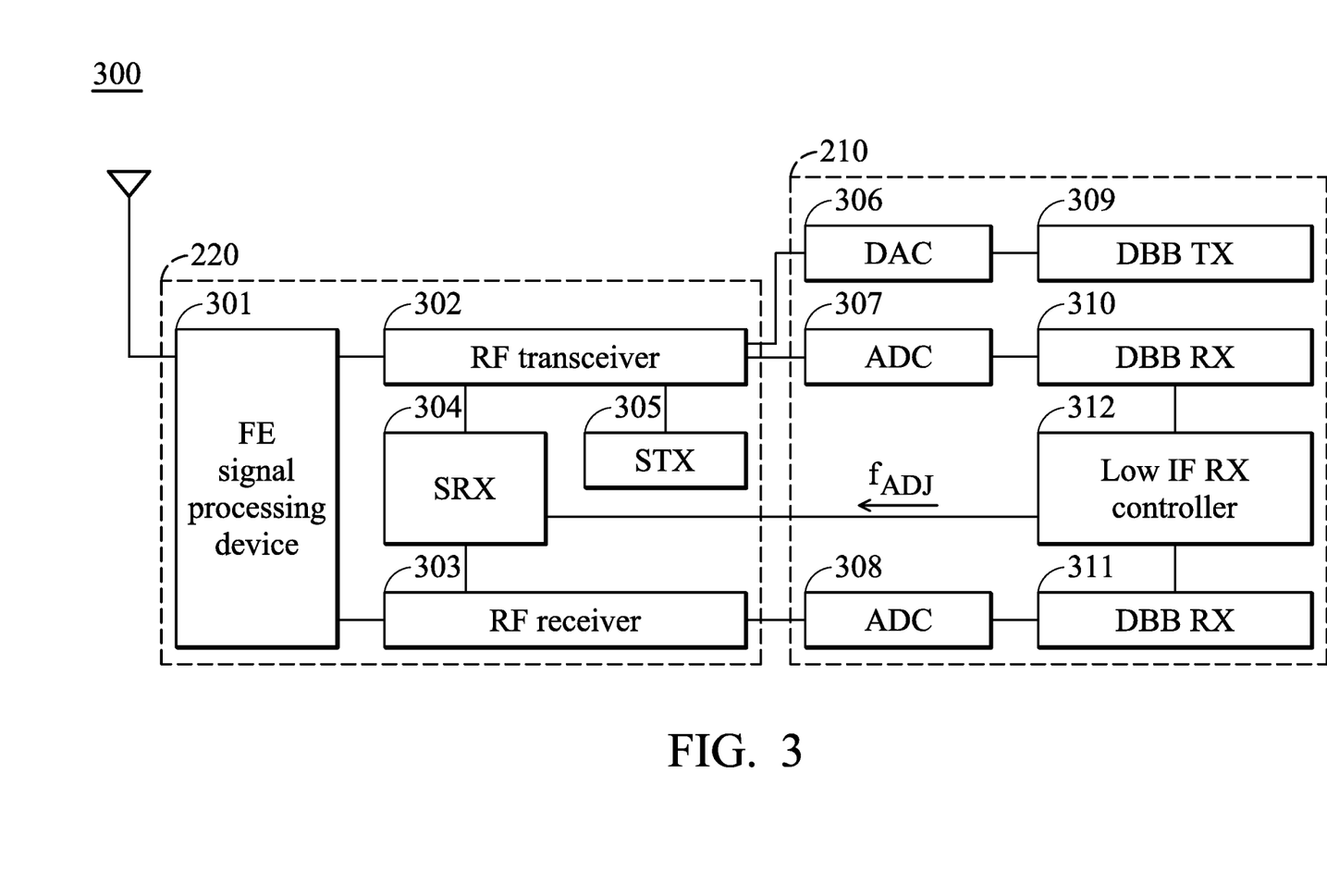
FIG. 3 shows an exemplary block diagram of the signal processing devices comprised in a radio module of a communications apparatus according to an embodiment of the invention.

FIG. 3 shows an exemplary block diagram of the signal processing devices comprised in a radio module of a communications apparatus according to an embodiment of the invention. The radio module 300 may comprise at least a front end (FE) signal processing device 301, a RF transceiver 302, a RF receiver 303, a receiving (RX) frequency synthesizer (SRX) 304, a transmitting (TX) frequency synthesizer (STX) 305, a digital-to-analog converter (DAC) 306, analog-to-digital converters (ADC) 307 and 308, a digital baseband TX signal processing device (DBB TX) 309, digital baseband RX signal processing devices (DBB RX) 310 and 311, and a low IF RX controller 312.

According to an embodiment of the invention, the radio module(s) (such as the radio modules 10, 20, 200, and 300) comprised in the proposed communications apparatus 100 is/are capable of supporting Carrier Aggregation (CA). For example, as shown in FIG. 3, the radio module 300 is capable of supporting at least the downlink CA since the radio module 300 is capable of processing RF signals of two downlink component carriers (CCs) via the RF transceiver 302 and the RF receiver 303, respectively. For example, the RF transceiver 302 or the RF receiver 303 (such as the RF transceiver 302) may be arranged to process the RF signals of a primary CC (PCC) and the other one (such as the RF receiver 303) may be arranged to process the RF signals of a secondary CC (SCC). Note that in the embodiments of the invention, the RF transceiver 302 and the RF receiver 303 may be configured in a single chip, or may be configured in different chips, and the invention should not be limited to any specific implementation method.

In addition, note further that the RF transceiver 302 and the RF receiver 303 may both comprise a plurality of hardware devices for performing RF signal processing. Depending on the type of CA (such as inter-band CA, intra-band non-contiguous CA and intra-band contiguous CA) implemented and the number of CCs configured by the network side, one or more hardware devices comprised in the RF transceiver 302 and/or the RF receiver 303 may be shared for processing the RF signals of different CCs. Therefore, the invention should not be limited to any specific implementation method.

According to an embodiment of the invention, the FE signal processing device 301, the RF transceiver 302, the RF receiver 303, the SRX 304 and the STX 305 may be comprised in the RF signal processing device 320 of the radio module 300, and the DAC 306, the ADCs 307 and 308, the DBB TX 309, the DBB RX 310 and 311, and the low IF RX controller 312 may be comprised in the baseband signal processing device 310 of the radio module 300. Note that FIG. 3 just presents one of a variety of embodiments to show some exemplary signal processing devices comprised in a radio module. It should be understood that there may still be a variety of different hardware combinations and different types of signal processing devices comprised in a radio module of the proposed communications apparatus, and therefore, the invention should not be limited to what is shown in FIG. 3.

According to an embodiment of the invention, the FE signal processing device 301 may comprise a plurality of front end signal processing devices for processing the RF signals received from the antenna module, such as one or more power amplifiers, switches, antenna selection modules, duplexers, or others. The RF transceiver 302 may comprise a plurality of RF signal processing devices for processing the TX signals received from the DAC 306 and the RX signals received from the FE signal processing device 301, such as one or more low noise amplifiers, one or more mixers, or others. The RF receiver 303 may comprise a plurality of RF signal processing devices for processing the RX signals received from the FE signal processing device 301, such as one or more low noise amplifiers, one or more mixers, or others. The SRX 304 is a frequency synthesizer arranged to provide one or more local oscillation (LO) signals that oscillate at a desired frequency to the RF transceiver 302 and the RF receiver 303 for processing the RX signals received from the FE signal processing device 301. For example, the LO signal may be provided to the mixer comprised in the RF transceiver 302 and the RF receiver 303 for frequency down converting the RX signals received from the FE signal processing device 301 to the baseband (that is, zero IF) or low IF signals to be processed by the baseband signal processing device 310. The STX 305 is a frequency synthesizer arranged to provide local oscillation (LO) signal that is oscillated in desired frequency to the RF transceiver 302 for processing the TX signals received from the DAC 306. For example, the LO signal may be provided to the mixer comprised in the RF transceiver 302 for frequency up converting the TX signals received from the DAC 306 and to be further processed by the FE signal processing device 301 and transmitted out by the antenna module.

The DAC 306 is configured to perform digital to analog conversion on the digital signals received from the DBB TX 309. The ADC 307 is configured to perform analog-to-digital conversion on the analog signals received from the RF transceiver 302. The ADC 308 is configured to perform analog-to-digital conversion on the analog signals received from the RF receiver 303. The DBB TX 309 may comprise a plurality of baseband signal processing devices for processing the baseband TX signals to be transmitted to the DAC 306. The DBB RX 310 and 311 may also comprise a plurality of baseband and/or low IF signal processing devices for processing the baseband and/or low IF RX signals respectively received from the ADCs 307 and 308. The low IF RX controller 312 is coupled to the DBB RX 310 and 311 and the SRX 304 for performing blocker detection and determining the oscillating frequency of the LO signals provided by the SRX 304 (which will be discussed further in the following paragraphs). Note that in some embodiments of the invention, the low IF RX controller 312 may also be integrated in a processor (not shown) of the baseband signal processing device 310 or the corresponding radio module, and the invention should not be limited to any specific implementation method.

It is well-known in the art that inter-modulation (IM) or inter-modulation distortion (IMD) is the amplitude modulation of signals containing two or more different frequencies in a system with nonlinearities. The intermodulation between each frequency component will form additional signals at frequencies that are not just at harmonic frequencies (integer multiples) of either, but also at the sum and difference frequencies of the original frequencies and at multiples of those sum and difference frequencies. Therefore, the communications apparatus (such as the communications apparatus 100) may experience the IMD problem due to the hardware device's nonlinearity when CA technology is applied. The receiving performance of communications apparatus may be seriously degraded when the interference power is great.

Figure 4:
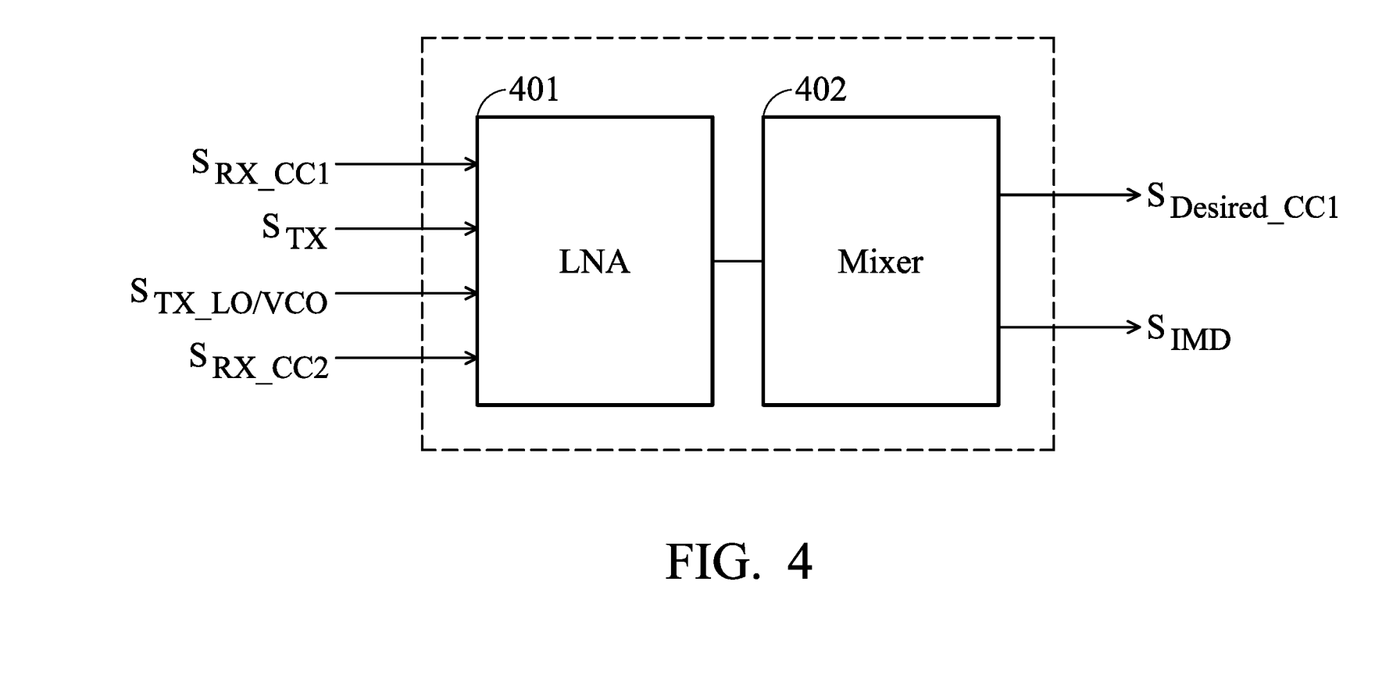
FIG. 4 is a schematic diagram showing the IMD generated in a system with nonlinearities according to an embodiment of the invention.

FIG. 4 is a schematic diagram showing the IMD generated in a system with nonlinearities according to an embodiment of the invention. Suppose that the communications apparatus (such as the communications apparatus 100) is capable of supporting CA and communicating with a peer communications apparatus in a wireless network via at least a first CC and a second CC, and there are at least an LNA 401 and a mixer 402 comprised in a RX receiver (such as the RF receiver 303 shown in FIG. 3) or a RF transceiver (such as the RF transceiver 302 shown in FIG. 3) of the communications apparatus. Besides the RX signal of the first CC $S_{RX\_CC1}$ that is desired for the RF transceiver, the LNA 401 may further receive other undesired signals, such as the TX signal $S_{TX}$ to be transmitted by the RF transceiver (and/or its harmonics), the LO signal provided by the STX (and/or its harmonics), and/or a reference signal generated by the voltage controlled oscillator (VCO) comprised in the STX and utilized for generating the LO signal $S_{TX\_LO/VCO}$ (and/or its harmonics), the RX signal of the second CC $S_{RX\_CC2}$ that is supposed to be processed by another RX receiver (such as the RF receiver 303 shown in FIG. 3), and/or others. The undesired signals may be "leaked" into the LNA 401 via either a coupling path (that is, via no physical wire or trace) or a direct connecting path (that is, via a physical wire or trace).

Due to the nonlinearities of the LNA 401 and the mixer 402, the IMD may be generated by the undesired signals $S_{TX}$, $S_{TX\_LO/VCO}$, $S_{RX\_CC2}$, and/or other undesired signals leaked into the LNA 401. Therefore, after being processed by the LNA 401 and the mixer 402, not only is the desired signal $S_{Desired\_CC1}$ generated, but also the undesired signals (represented by $S_{IMD}$ for simplicity) will be generated. When any undesired signal $S_{IMD}$ falls in the frequency range of the desired channel of the desired signal $S_{Desired\_CC1}$, interference occurs.

Figure 5A:
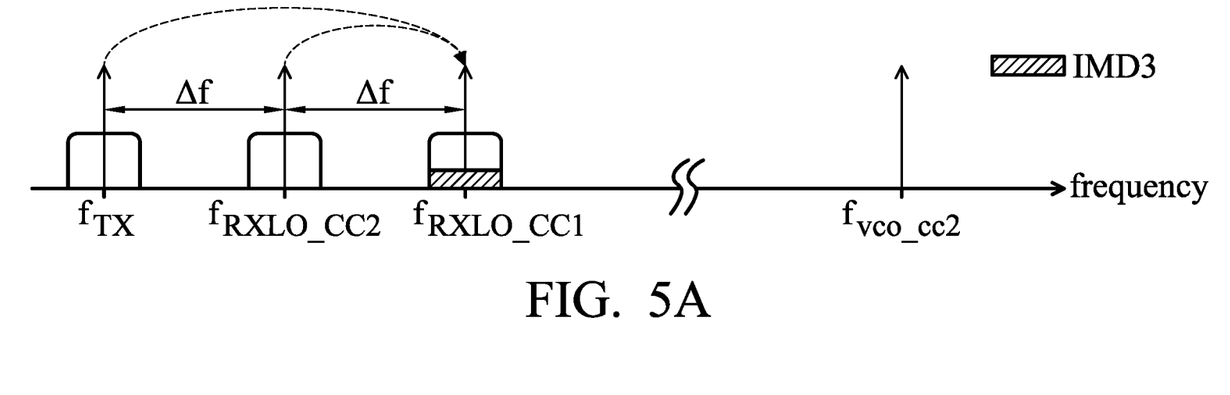
FIG. 5A is a frequency spectrum showing an exemplary scenario for illustrating the undesired IMD signal.

FIG. 5A is a frequency spectrum showing an exemplary scenario for illustrating the undesired IMD signal. Suppose that the LO frequency of the LO signal provided to the corresponding mixer for performing frequency up or down conversion on the corresponding TX or RX signal is respectively set to the central frequency of a desired channel of the TX signal, or of the RX signal the first/second CC. In the scenario shown in FIG. 5A, when the frequency spacing between the LO frequency $f_{TX}$ of the LO signal provided for processing the TX signal and the LO frequency $f_{RXLO\_CC2}$ of the LO signal provided for processing the RX signal of the second CC, and the LO frequency $f_{RXLO\_CC2}$ of the LO signal provided for processing the RX signal of the second CC and the LO frequency $f_{RXLO\_CC1}$ of the LO signal provided for processing the RX signal of the first CC are both $\Delta f$, a third-order inter-modulation distortion (labeled IMD3) term falls in the desired channel of the first CC since $2*f_{RXLO\_CC2}-1*f_{TX}=f_{RXLO\_CC1}$.

Figure 5B:
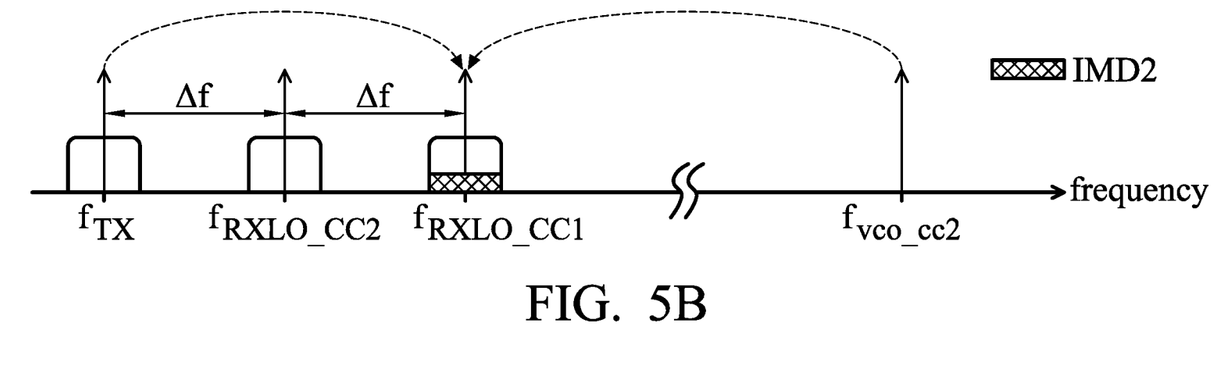
FIG. 5B is a frequency spectrum showing another exemplary scenario for illustrating the undesired IMD signal.

FIG. 5B is a frequency spectrum showing another exemplary scenario for illustrating the undesired IMD signal. In the scenario as shown in FIG. 5B, when the frequency of a reference signal generated by the VCO and utilized for generating the LO signal for the second CC is twice of the frequency of the LO signal for the second CC, a second-order inter-modulation distortion (labeled IMD2) term falls in the desired channel of the first CC since $1*f_{VCO\_CC2}-1*f_{TX}=f_{RXLO\_CC1}$. Another IMD2 term contributed by a second-order harmonic of the LO signal for the second CC will also fall in the desired channel of the first CC since $1*2^{nd} f_{RXLO\_CC2}-1*f_{TX}=f_{RXLO\_CC1}$.

When any undesired signal falls in the frequency range of the desired channel of a desired signal, interference occurs. The receiving performance of communications apparatus may be seriously degraded when the interference power is great. In order to solve this problem, methods for avoiding IMD in a communications apparatus are proposed and illustrated in the following paragraphs.

Figure 6:
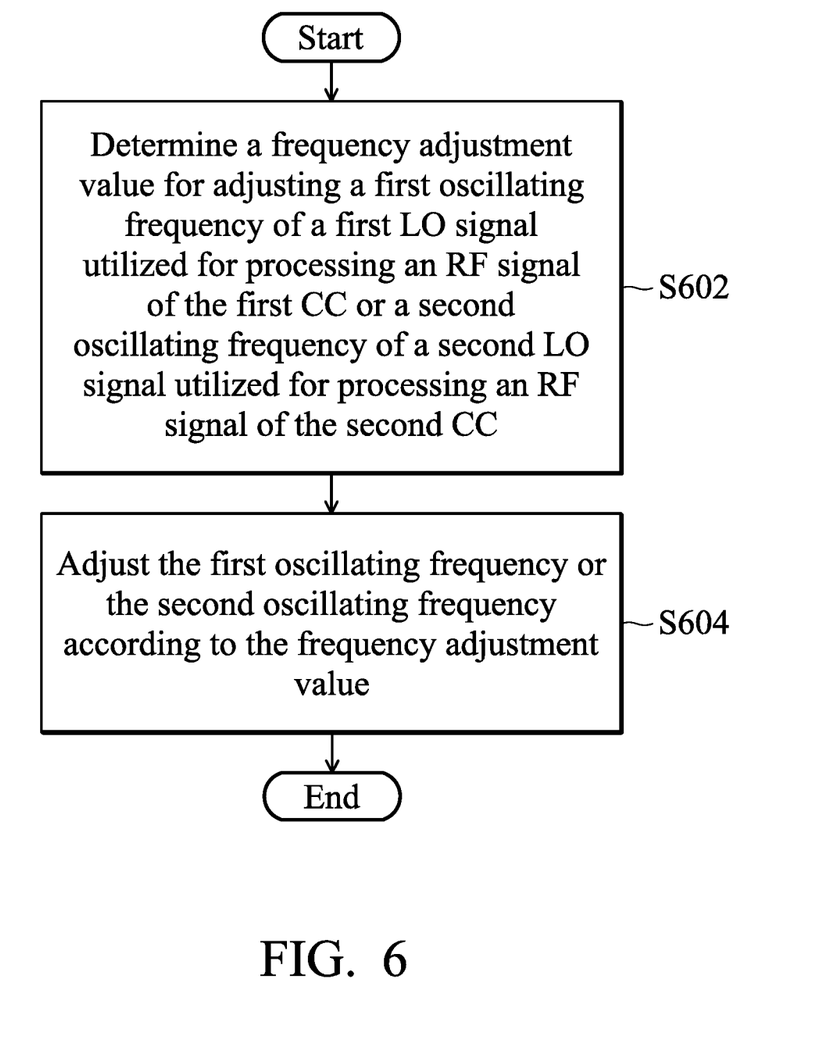
FIG. 6 is a flow chart of a method for avoiding IMD in a communications apparatus according to an embodiment of the invention.

FIG. 6 is a flow chart of a method for avoiding IMD in a communications apparatus according to an embodiment of the invention. According to the embodiments of the invention, the communications apparatus (such as the communications apparatus 100) is capable of supporting CA and communicating with a peer communications apparatus in a wireless network via at least a first CC and a second CC. When an RF signal or a baseband signal of the second CC is detected as being interfered with by an IMD signal that is contributed by any signal component related to the first CC or the second CC, or other signals as described above, the communications apparatus may determine a frequency adjustment value $f_{ADJ}$ for adjusting a first oscillating frequency of a first local oscillation (LO) signal utilized for processing an RF signal of the first CC or a second oscillating frequency of a second LO signal utilized for processing an RF signal of the second CC (Step S602). Next, the communications apparatus may adjust the first oscillating frequency or the second oscillating frequency according to the frequency adjustment value $f_{ADJ}$ (Step S604). Note that in the embodiments of the invention, whether to adjust the first oscillating frequency or the second oscillating frequency may be determined based on how the IMD is caused.

The concept of how to determine the first or second oscillating frequency to be adjusted is to select the one (or more) that can make the IMD signal to be moved out from the desired channel of the second CC after the frequency adjustment. Therefore, the CC with the corresponding oscillating frequency being/to be adjusted is not limited to the CC being interfered-with or the CC that causes the IMD signal.

According to an embodiment of the invention, when any undesired IMD signal falls in the frequency range of the desired channel of a desired signal of a specific CC, the desired signal (which can be either the RF signal or the baseband signal) of the specific CC is determined as being interfered with by the IMD signal. In addition, the communications apparatus may determine whether any undesired IMD signal falls in the frequency range of the desired channel of a desired signal of a specific CC according to the frequency ranges of the desired channel of a desired signal of the specific CCs (hereinafter called the interfered-with CC) and the frequency ranges of the signal component(s) related to the other CC(s) (hereinafter called the interfering CC). Note that, in the embodiments of the invention, the interfered-with CC may also interfered by the signal components contributed by itself. Therefore, the interfered-with CC may also be the interfering CC as well. The IMD mainly comes from a combination of the TX signal of some CC and LO signal (and/or corresponding harmonics) of other CC. That is, it may occur that when the IMD signal produced by the TX signal of a CC interferes with the RX signal of that CC.

According to an embodiment of the invention, the signal component that is related to an interfering CC may be selected from a group comprising the LO signal for the interfering CC, a harmonic of the LO signal, a reference signal utilized for generating the LO signal and a harmonic of the reference signal. For example, the signal component that is related to a first CC and may cause the IMD may be selected from a group comprising the first LO signal, a harmonic of the first LO signal, a reference signal utilized for generating the first LO signal (for example, the reference signal generated by the corresponding VCO) and a harmonic of the reference signal.

To be more specific, in an embodiment of the invention, the low IF RX controller (such as the low IF RX controller 312 shown in FIG. 3) of the communications apparatus may determine whether to adjust the oscillating frequency of an LO signal utilized for processing the RF signal of the interfering CC or the oscillating frequency of an LO signal utilized for processing the RF signal of the interfered-with CC, determine a direction in which to adjust (for example by decreasing or increasing) the corresponding oscillating frequency, determine the frequency adjustment value $f_{ADJ}$, and provide the frequency adjustment value $f_{ADJ}$ to the corresponding frequency synthesizer generating the LO signal (such as the SRX 304 shown in FIG. 3) for processing the RF signal of the interfering CC or the RF signal of the interfered-with CC.

The frequency synthesizer receiving the frequency adjustment value $f_{ADJ}$ may then adjust the oscillating frequency of the LO signal according to the frequency adjustment value $f_{ADJ}$. Note that the low IF RX controller may also directly direct the frequency synthesizer to adjust the oscillating frequency of the LO signal and teach the frequency synthesizer how to adjust it.

According to an embodiment of the invention, the oscillating frequency of the LO signal for processing the RF signal of a CC is originally set to be equal to the central frequency of a desired channel of that CC. After adjusting the oscillating frequency, the oscillating frequency does not equal the central frequency of the desired channel of that CC.

In addition, according to an embodiment of the invention, the low IF RX controller may determine the frequency adjustment value according to a bandwidth of a desired channel of the interfered-with CC (for example, the first CC in the scenario shown in FIG. 5A and FIG. 5B). In a preferred embodiment of the invention, the frequency adjustment value $f_{ADJ}$ is substantially equal to half the bandwidth of a desired channel of the interfered-with CC.

Figure 7A:
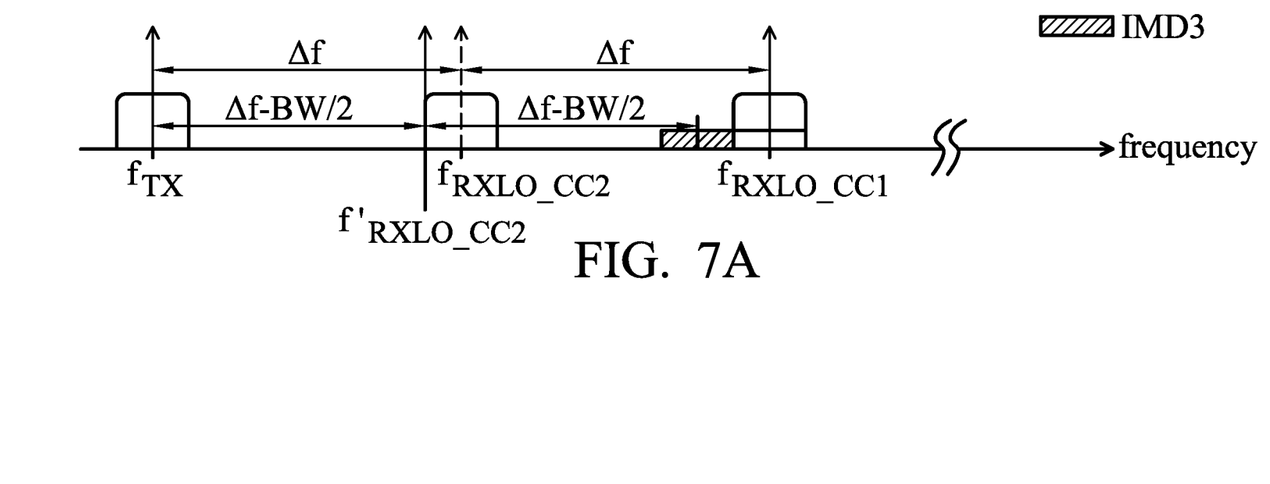
FIG. 7A is a frequency spectrum showing an exemplary scenario after adjusting the oscillating frequency of the LO signal according to an embodiment of the invention.

FIG. 7A is a frequency spectrum showing an exemplary scenario after adjusting the oscillating frequency of the LO signal of the interfering CC (for example, the second CC in the scenario shown in FIG. 5A and FIG. 5B) according to an embodiment of the invention. Suppose that the bandwidth of the desired channel of the interfered-with CC (for example, the first CC in the scenario shown in FIG. 5A and FIG. 5B) is BW and the frequency adjustment value $f_{ADJ}$ equals half the bandwidth BW. When the LO frequency $f_{RXLO\_CC2}$ of the LO signal provided for processing the RX signal of the second CC is adjusted by decreasing BW/2, that is, $f'_{RXLO\_CC2}=f_{RXLO\_CC2}-BW/2$, the third-order inter-modulation distortion (labeled IMD3) term can be moved out from the desired channel of the first CC as shown in FIG. 7A.

Figure 7B:
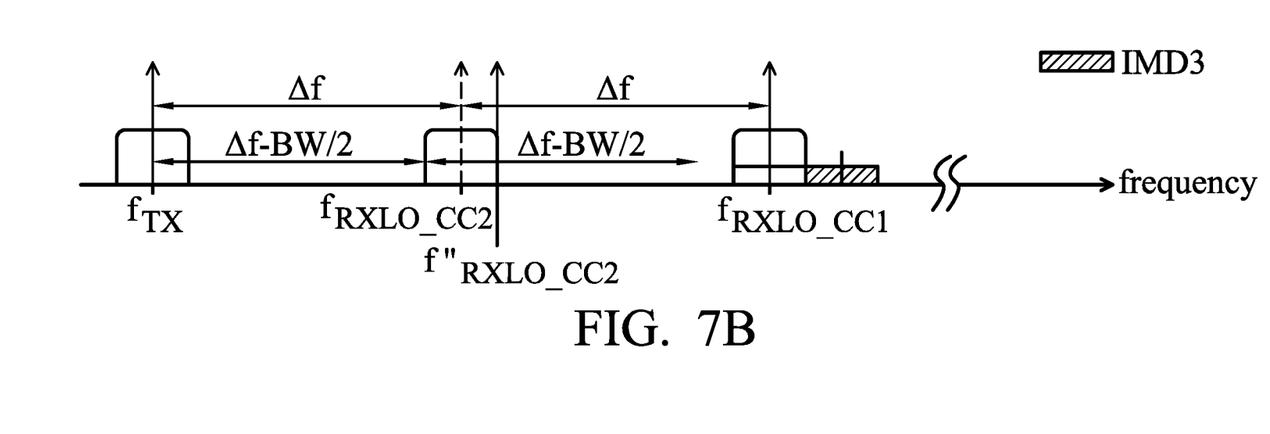
FIG. 7B is a frequency spectrum showing another exemplary scenario after adjusting the oscillating frequency of the LO signal according to another embodiment of the invention.

FIG. 7B is a frequency spectrum showing another exemplary scenario after adjusting the oscillating frequency of the LO signal of the interfering CC (for example, the second CC in the scenario shown in FIG. 5A and FIG. 5B) according to another embodiment of the invention. When the LO frequency $f_{RXLO\_CC2}$ of the LO signal provided for processing the RX signal of the second CC is adjusted by increasing BW/2, that is, $f''_{RXLO\_CC2}=f_{RXLO\_CC2}+BW/2$, the third-order inter-modulation distortion (labeled IMD3) term can also be moved out from the desired channel of the first CC as shown in FIG. 7B.

Note that, although setting the frequency adjustment value $f_{ADJ}$ to half the bandwidth of a desired channel of the interfered-with CC is a preferred embodiment, the invention should not be limited thereto. In other embodiments of the invention, the frequency adjustment value $f_{ADJ}$ may also be set to another value, depending on the different system requirements.

Note further that, although in the exemplary scenarios shown in FIG. 7A and FIG. 7B, the oscillating frequency of the LO signal of the second CC is adjusted, the invention should not be limited thereto. As discussed above, the low IF RX controller may also determine to adjust the oscillating frequency of the LO signal of the first CC (i.e. the interfered CC in the exemplary scenarios shown in FIG. 7A and FIG. 7B), as long as the IMD term can also be moved out from the desired channel of the first CC.

According to another embodiment of the invention, the low IF RX controller (such as the low IF RX controller 312 shown in FIG. 3) of the communications apparatus may also perform a blocker detection to detect whether a blocker signal exists and is distributed around a desired channel of a CC. For example, in one embodiment of the invention, the low IF RX controller may receive the baseband signal of one CC and detect whether the blocker signal exists and is distributed around the desired channel of that CC according to a frequency and power of the blocker signal in the baseband signal of that CC.

When the blocker signal exists and is distributed around the desired channel of a CC, the low IF RX controller may determine a direction in which to adjust the oscillating frequency of the LO signal of that CC according to the frequency of the blocker signal. Since the bandwidth of a filter utilized for filtering the desired signal of one CC should be increased accordingly when the oscillating frequency of the LO signal of that CC is adjusted, some undesired blocker signal distributed around the desired channel of that CC will be left in the filtered signal after the filtering process of the desired signal of that CC. Therefore, in the embodiments of the invention, the direction in which to adjust the oscillating frequency of the LO signal of that CC should be carefully considered so that the blocker signal distributed around the desired channel of that CC can be filtered out and will not be left in the filtered signal after the filtering process. According to an embodiment of the invention, the blocker signal may be an adjacent channel interference of that CC.

Figure 8A:
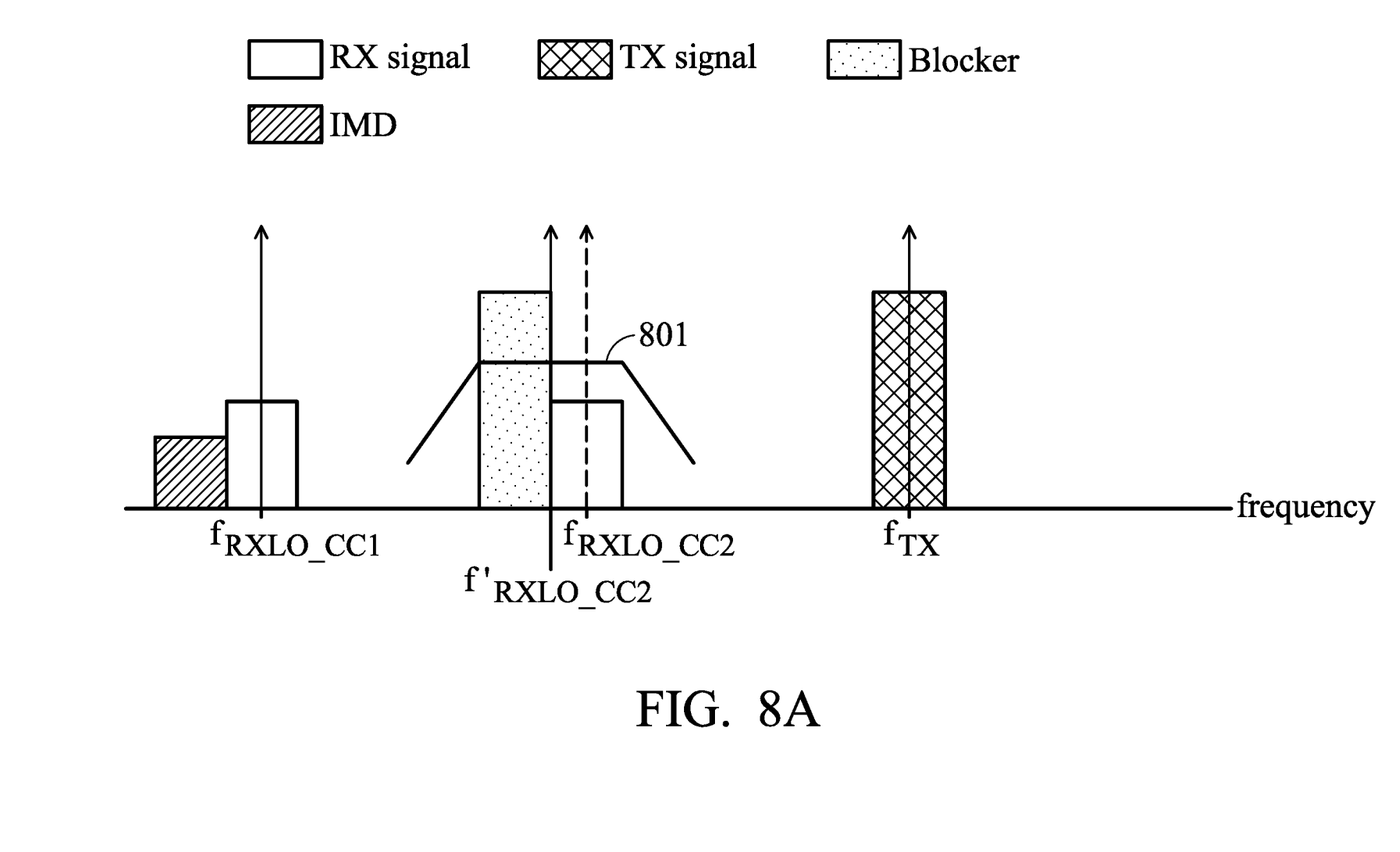
FIG. 8A is a frequency spectrum showing an exemplary scenario of adjusting the oscillating frequency of the LO signal when a blocker signal exists according to an embodiment of the invention.

FIG. 8A is a frequency spectrum showing an exemplary scenario of adjusting the oscillating frequency of the LO signal of the one CC when a blocker signal exists according to an embodiment of the invention. Suppose there is a blocker signal distributed around the desired channel of the second CC CC2. As shown in FIG. 8A, if the low IF RX controller determines to decrease the oscillating frequency $f_{RXLO\_CC2}$ of the LO signal of the CC as $f'_{RXLO\_CC2}$, the blocker signal still inevitably falls the passband 801 of a filter utilized for filtering the desired signal of the second CC CC2. Therefore, even if the IMD signal term can also be moved out from the desired channel of the first CC CC1, the filtered signal of the second CC CC2 is still interfered with by the blocker signal.

Figure 8B:
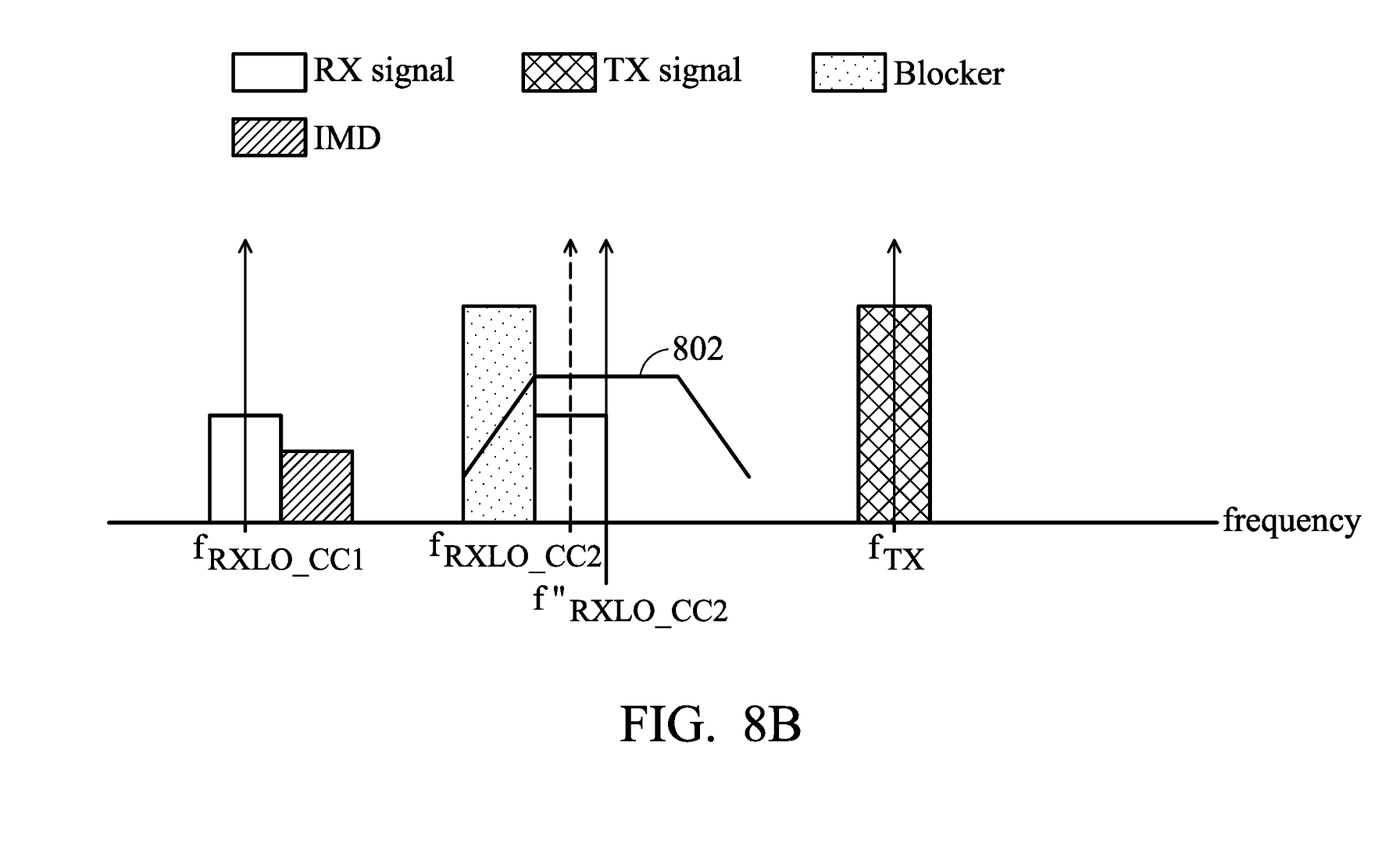
FIG. 8B is a frequency spectrum showing an exemplary scenario of adjusting the oscillating frequency of the LO signal when a blocker signal exists according to another embodiment of the invention.

FIG. 8B is a frequency spectrum showing an exemplary scenario of adjusting the oscillating frequency of the LO signal of one CC when a blocker signal exists according to another embodiment of the invention. According to an embodiment of the invention, the low IF RX controller may determine to increase or decrease the oscillating frequency of the LO signal of one CC by the frequency adjustment value $f_{ADJ}$. Preferably, when the central frequency of the blocker signal is smaller than the central frequency of the desired channel of that CC, the low IF RX controller determines to increase the oscillating frequency of the LO signal of that CC by the frequency adjustment value. As shown in FIG. 8B, by increasing the oscillating frequency of the LO signal of that CC, the blocker signal becomes far away from the adjusted oscillating frequency $f''_{RXLO\_CC2}$, and can be moved outside of the passband 802 of a filter utilized for filtering the desired signal of that CC. Therefore, the blocker signal can be filtered out more easily after the filtering process and will not become an interference signal anymore. On the other hand, when the central frequency of the blocker signal is greater than the central frequency of the desired channel of that CC, the low IF RX controller determines to decrease the oscillating frequency of the LO signal of that CC by the frequency adjustment value. Similarly, by decreasing the oscillating frequency of the LO signal of that CC, the blocker signal can be moved outside of the passband of a filter utilized for filtering the desired signal of that CC. Therefore, the blocker signal can be filtered out more easily after the filtering process and will not become an interference signal anymore.

Based on the proposed method and the corresponding hardware components implementing the method, the undesired IMD term can no longer interfere with the desired signal of each CC utilized in CA. In addition, when determining a preferred direction in which to further adjust the oscillating frequency according to the blocker detection result, the blocker signal can also be filtered out more easily after the filtering process and will not become an interference signal anymore.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, capable of supporting carrier aggregation and communicating with a peer communications apparatus in a wireless network via at least a first component carrier (CC) and a second CC, the communications apparatus comprising:
   a radio frequency (RF) signal processing device configured to process a first RF signal of the first CC and a second RF signal of the second CC; and
   a baseband signal processing device configured to process a first baseband signal of the first CC and a second baseband signal of the second CC,
   wherein the RF signal processing device is further configured to
      generate a first local oscillation (LO) signal oscillated at a first oscillating frequency for processing the first RF signal of the first CC, and
      generate a second LO signal oscillated at a second oscillating frequency for processing the second RF signal of the second CC, the second oscillating frequency being set according to an initial frequency and a frequency adjustment value, and wherein the baseband signal processing device is further configured to
      determine the frequency adjustment value when the first RF signal or the first baseband signal of the first CC is determined to be interfered with by an intermodulation distortion (IMD) signal contributed by a signal component related to the second LO signal under a condition that the second LO signal is oscillated at the initial frequency,
      output the frequency adjustment value to the RF signal processing device,
      determine whether a blocker signal exists and is distributed around a desired channel of the second CC,
      when a central frequency of the blocker signal is greater than a central frequency of the desired channel of the second CC, determine to set the second oscillating frequency by decreasing from the initial frequency by the frequency adjustment value, and
      when the central frequency of the blocker signal is smaller than the central frequency of the desired channel of the second CC, determine to set the second oscillating frequency by increasing from the initial frequency by the frequency adjustment value.

2. The communications apparatus as claimed in claim 1, wherein the baseband signal processing device is further configured to
   determine whether the first RF signal or the first baseband signal of the first CC is interfered with by the IMD signal.

3. The communications apparatus as claimed in claim 1, wherein the signal component related to the second LO signal includes
   a modulated signal from modulating a third LO signal by the second LO signal, the third LO signal being for processing a transmission signal,
   a reference signal utilized for generating the second LO signal, or
   a harmonic of the reference signal.

4. The communications apparatus as claimed in claim 1, wherein the baseband signal processing device is further configured to
   receive the second baseband signal of the second CC, and
   determine whether the blocker signal exists and is distributed around the desired channel of the second CC according to a frequency and a power of the blocker signal in the second baseband signal of the second CC.

5. The communications apparatus as claimed in claim 1, wherein the baseband signal processing device is further configured to determine the frequency adjustment value to be substantially half of a bandwidth of a desired channel of the second CC.

6. A method for a communications apparatus capable of supporting carrier aggregation and communicating with a peer communications apparatus in a wireless network via at least a first component carrier (CC) and a second CC, the method comprising:
   receiving a first RF signal of the first CC and a second RF signal of the second CC;
   generating a first local oscillation (LO) signal oscillated at a first oscillating frequency for processing the first RF signal of the first CC;
   determining a frequency adjustment value for setting a second oscillating frequency of a second LO signal for processing the second RF signal of the second CC when the first RF signal or a first baseband signal of the first CC is determined to be interfered with by an inter-modulation distortion (IMD) signal contributed by a signal component related to the second LO signal under a condition that the second LO signal is oscillated at an initial frequency;

determining whether a blocker signal exists and is distributed around a desired channel of the second CC;

when a central frequency of the blocker signal is greater than a central frequency of the desired channel of the second CC, determining to set the second oscillating frequency by decreasing from the initial frequency by the frequency adjustment value;

when the central frequency of the blocker signal is smaller than the central frequency of the desired channel of the second CC, determining to set the second oscillating frequency by increasing from the initial frequency by the frequency adjustment value; and generating the second LO signal oscillated at the second oscillating frequency.

7. The method as claimed in claim 6, wherein the determining whether the blocker signal exists and is distributed around the desired channel of the second CC is performed according to a frequency and a power of the blocker signal in second baseband signal of the second CC.

8. The method as claimed in claim 6, wherein the signal component related to the second LO signal includes
- a modulated signal from modulating a third LO signal by the second LO signal, the third LO signal being for processing a transmission signal,
- a reference signal utilized for generating the second LO signal, or
- a harmonic of the reference signal.

9. The method as claimed in claim 6, wherein the determining the frequency adjustment value comprises determining the frequency adjustment value to be substantially half of a bandwidth of a desired channel of the second CC.

* * * * *